J. E. GARRETTE.
DASHER.
APPLICATION FILED AUG. 27, 1914.

1,186,475.

Patented June 6, 1916.

Witnesses:
Clarence Perdew
Catherine Doran

Inventor
John E. Garrette
By
James N. Ramsey
Attorney

UNITED STATES PATENT OFFICE.

JOHN E. GARRETTE, OF CINCINNATI, OHIO.

DASHER.

1,186,475.  Specification of Letters Patent.  Patented June 6, 1916.

Application filed August 27, 1914. Serial No. 858,818.

*To all whom it may concern:*

Be it known that I, JOHN E. GARRETTE, a citizen of the United States, and a resident of Cincinnati, in the county of Hamilton and State of Ohio, have invented a certain new and useful Dasher, of which the following is a specification.

My invention relates to apparatus for treating butter and milk products; and the object is to increase the efficiency of such apparatus, as will hereinafter be more fully described.

My invention consists in the details of construction as hereinafter more fully set forth and claimed.

Figure 2:
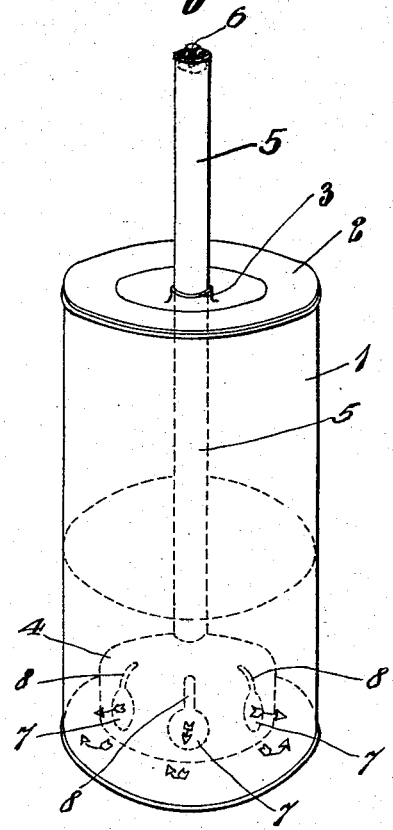
Figure 1:
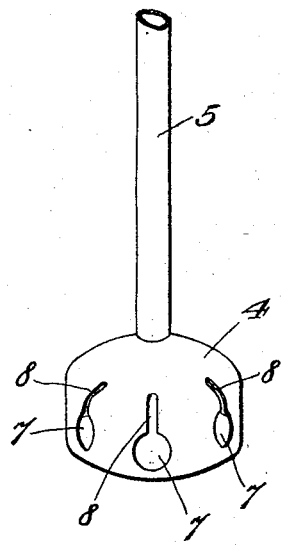

In the drawing: Figure 1 is a perspective view of the dasher; and Fig. 2 is a similar view of the apparatus in which the dasher is used.

The dasher is preferably used in a tall cylindrical vessel 1 provided with a lid 2 having a central opening 3. This dasher is of the type comprising a lower main part or body 4 and a hollow stem 5 extending up from the top of the body 4 through the central opening 3 in the cover 2, as shown in Fig. 2. The top of this stem 5 is provided with a valve 6 which opens as the dasher is moved up and closes as the dasher is moved down in the vessel. The body 4 of the plunger is of low cylindrical formation with an open bottom and an upwardly convex top to which the stem 5 is fastened and through which the interior of the stem communicates with the interior of the body. Around in the cylindrical side walls of this body 4 are openings 7, which are preferably circular, and of diameter about half the height of said walls, very close to their bottom, and which preferably have narrow continuations or slits 8 extending up from their upper sides into the convex top of the body.

The construction of the dasher is novel in the arrangement of the comparatively large openings in the sides of the low cylindrical body all very close to the bottom thereof, and with the bottom of the body open in conjunction with the admission of atmospheric air down through the hollow stem 5 as controlled by the valve and cap arrangement at the top. By limiting the quantity of material in the vessel to about that indicated by the dotted line in Fig. 2, the plunger, at each stroke, is drawn up far enough to draw the bottom of the plunger out of the liquid in the vessel, and then when the plunger is forced downward and the body of the plunger is submerged with the valve 6 preventing escape of air from the top of the stem 5, air will be forced out through the side openings in the body of the plunger as well as from under the bottom thereof; and these two currents, colliding as indicated by the arrows in Fig. 2, produce a novel action on the material, securing an agitation due to the action of the air currents in the regions around the sides of the bottom of the vessel. The slits 8, carried up from the openings 7, permit the escape of material from under the top of the plunger body 4 without permitting the ready escape of air upward at these points, but compelling the greater part of the escaping air to pass out substantially horizontally in close proximity to that escaping from the bottom, as indicated by the arrows in Fig. 2. The air coming from under the plunger is diverted upward by the sides of the vessel and collides with the other air currents as described.

Having fully described my invention, what I claim as new and desire to secure by Letters Patent is:

A dasher comprising a low cylindrical body with an upwardly convex top and open bottom, and means for admitting air and controlling the admission of air through said top as the dasher is operated up and down in a substance, the cylindrical sides of said body having openings therein of diameter equal to substantially half of the height of and close to the bottom of said sides, from which air escapes when the dasher is forced down in the substance, to collide with air escaping from the open bottom, and each of said openings in said side having a slit extending up into the convex top of the body to prevent lodgment of substance on the under side of the top without allowing undue escape of air from the dasher at the top.

JOHN E. GARRETTE.

Witnesses:
EDWARD C. ASHLEY,
GEORGE WOLPER.

Copies of this patent may be obtained for five cents each, by addressing the "Commissioner of Patents, Washington, D. C."